(12) United States Patent
Cornelissen

(10) Patent No.: US 10,285,530 B2
(45) Date of Patent: May 14, 2019

(54) COOKING ATTACHMENT FOR A HEATABLE JAR OF A FOOD PROCESSOR

(71) Applicant: Vorwerk & Co. Interholding GmbH, Wuppertal (DE)

(72) Inventor: Markus Cornelissen, Bornheim (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 154 days.

(21) Appl. No.: 14/923,601

(22) Filed: Oct. 27, 2015

(65) Prior Publication Data
US 2016/0113432 A1   Apr. 28, 2016

(30) Foreign Application Priority Data

Oct. 28, 2014   (DE) .................. 10 2014 115 649

(51) Int. Cl.
| | |
|---|---|
| *A47J 27/04* | (2006.01) |
| *A47J 36/20* | (2006.01) |
| *A47J 43/07* | (2006.01) |

(52) U.S. Cl.
CPC .............. *A47J 27/04* (2013.01); *A47J 36/20* (2013.01); *A47J 43/0716* (2013.01); *A47J 2027/043* (2013.01)

(58) Field of Classification Search
CPC ....... A47J 27/08; A47J 27/04; A47J 2027/043
USPC ........................................... 99/403
See application file for complete search history.

(56) References Cited

U.S. PATENT DOCUMENTS

| | | | | |
|---|---|---|---|---|
| 4,650,968 A | * | 3/1987 | Williams | A47J 27/04 126/20 |
| 4,920,251 A | * | 4/1990 | Whitenack | A47J 27/004 219/401 |
| 5,275,094 A | * | 1/1994 | Naft | A47J 36/20 126/369 |
| 5,391,262 A | * | 2/1995 | Wilkerson, Jr. | B01D 3/006 203/10 |
| 5,794,524 A | * | 8/1998 | Kemker | A47J 27/04 126/369 |
| 2002/0129714 A1 | * | 9/2002 | Lee | A47J 36/08 99/403 |

(Continued)

FOREIGN PATENT DOCUMENTS

| | | | | |
|---|---|---|---|---|
| EP | 2042060 A1 | * | 4/2009 | A47J 27/04 |
| WO | 95/029615 A1 | | 11/1995 | |

*Primary Examiner* — Ibrahime A Abraham
*Assistant Examiner* — Spencer H. Kirkwood
(74) *Attorney, Agent, or Firm* — Collard & Roe, P.C.

(57) ABSTRACT

The invention relates to a cooking attachment (2) for a heatable vessel (3) of a kitchen appliance, which cooking attachment (2) has a bottom (4) comprising at least one bottom opening (5), through which steam, which escapes from the vessel (3), can enter the cooking attachment (2) and/or condensate, which escapes from the cooking attachment (2), can enter the vessel (3). To attain a more homogenous and quicker cooking of the food contained in the cooking attachment (2), it is proposed for the bottom (4) to have a plurality of spacers (6), which stick out from the bottom (4), for keeping a food contained in the cooking attachment (2) at a distance from the bottom opening (5), on the side, which faces the interior of the cooking attachment (2), wherein the bottom opening (5) is at least partially surrounded by the spacers (6) in circumferential direction.

11 Claims, 12 Drawing Sheets

(56) References Cited

U.S. PATENT DOCUMENTS

2003/0145741 A1* 8/2003 Holl ..................... A47J 37/101
                                                      99/450
2013/0134805 A1* 5/2013 Jung ..................... H02K 21/44
                                                      310/46

* cited by examiner

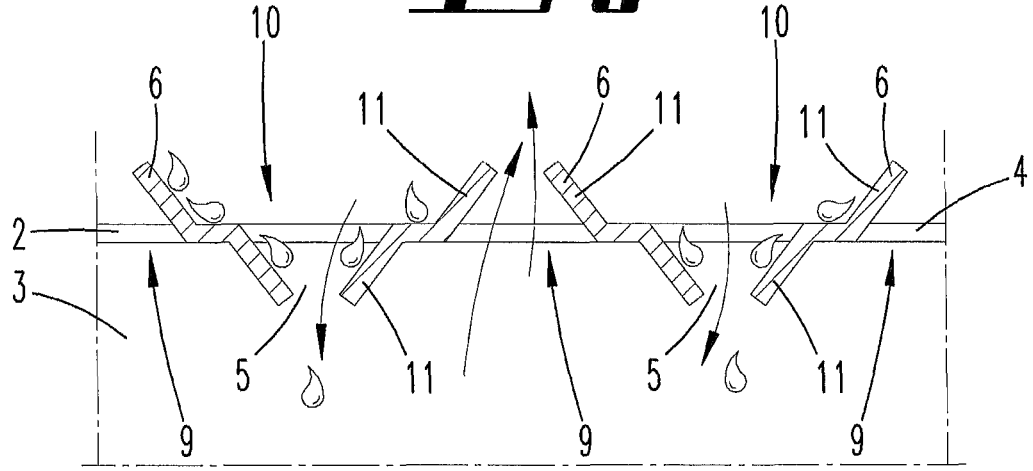
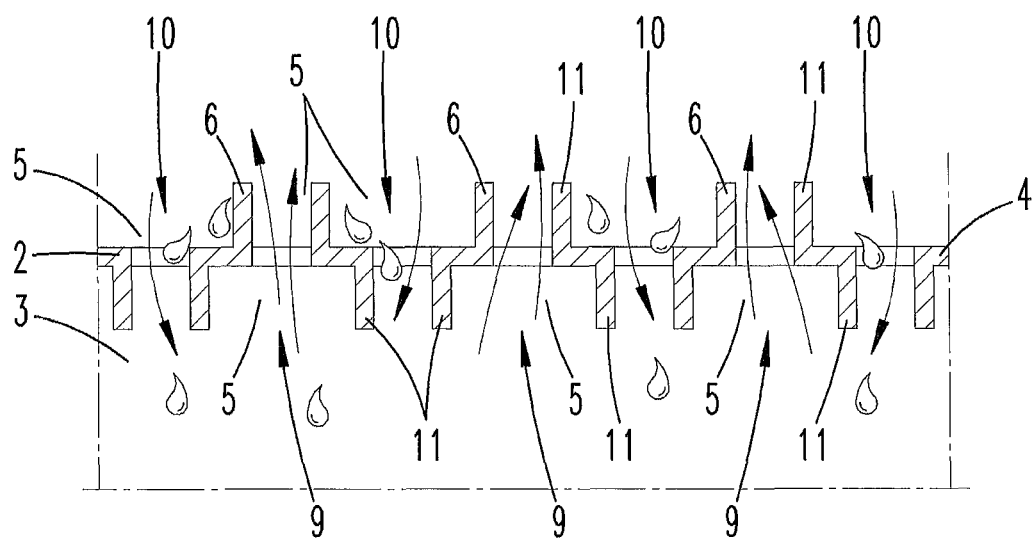

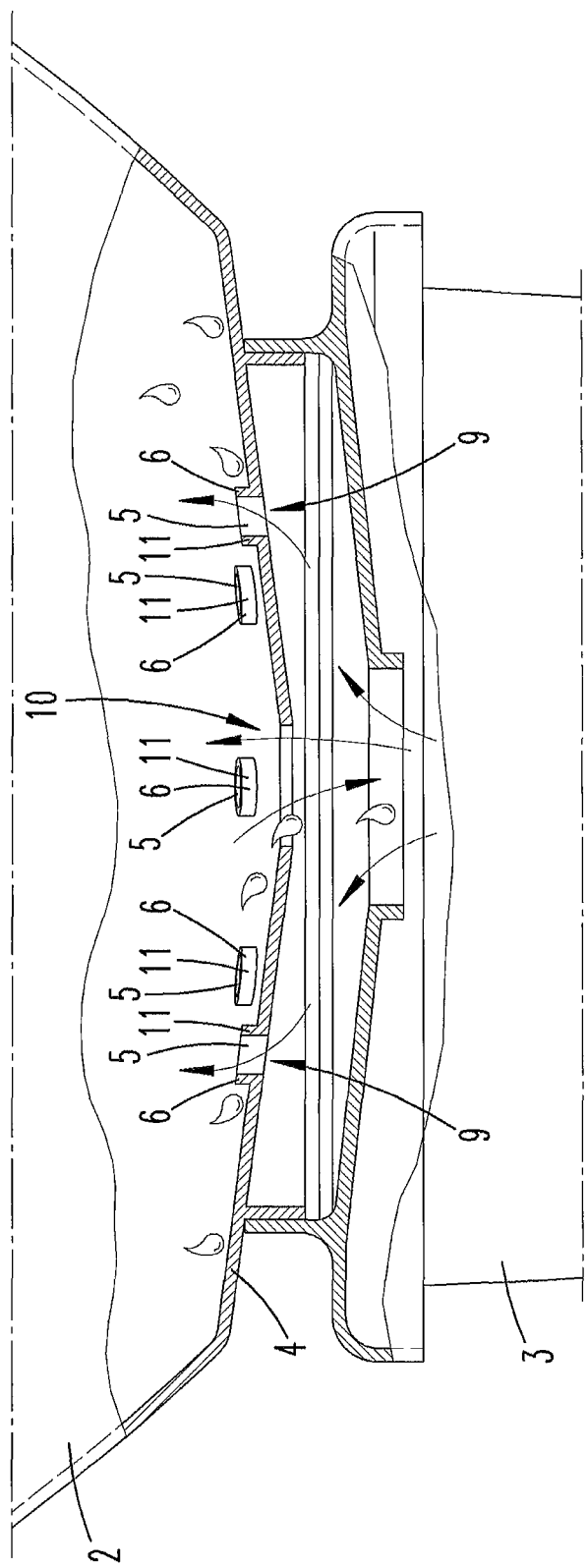

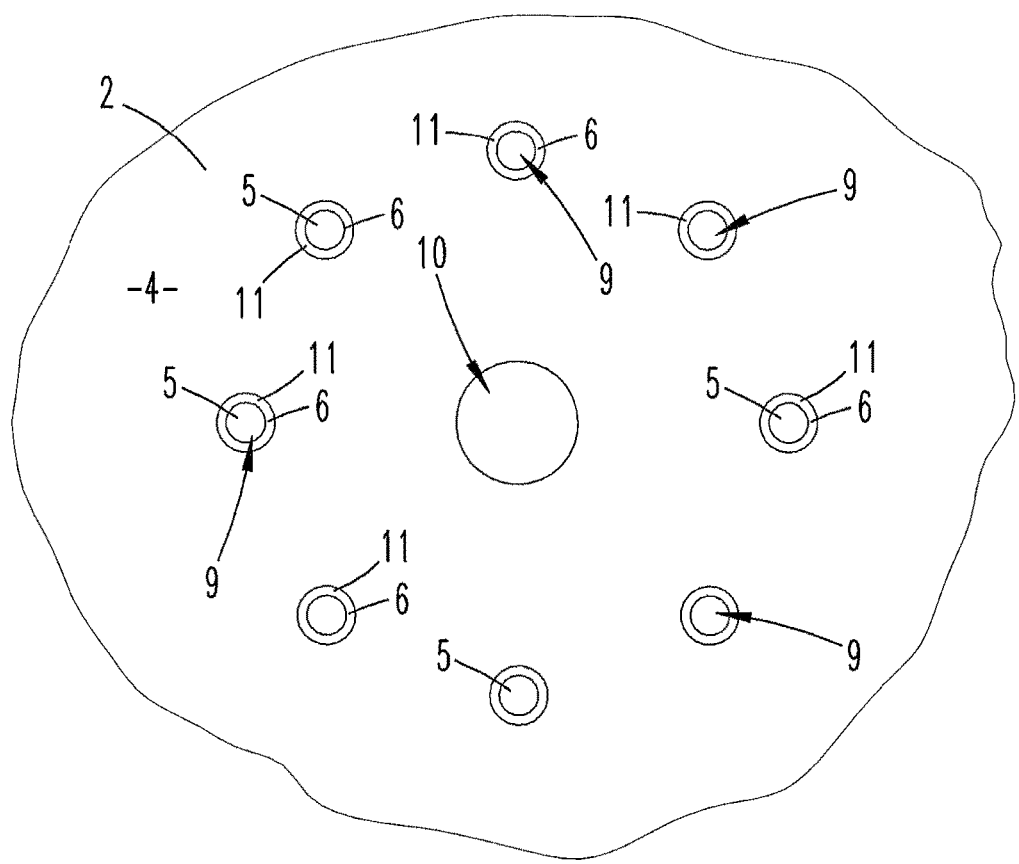
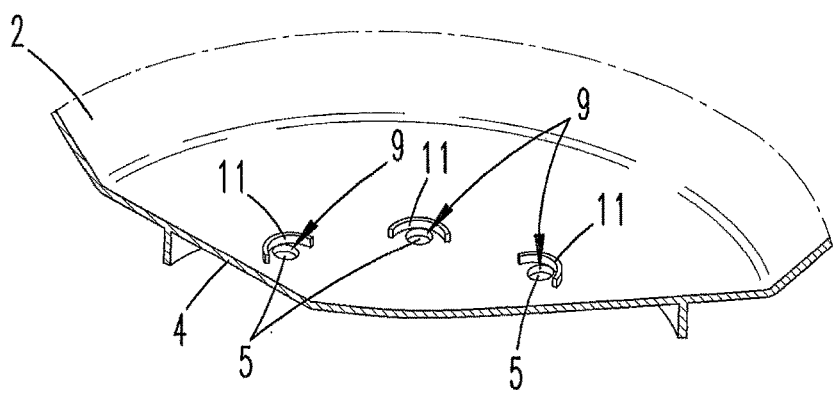

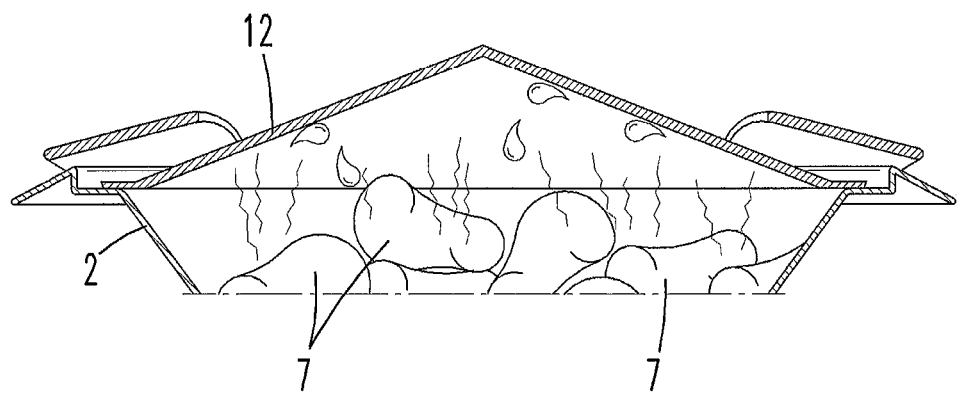
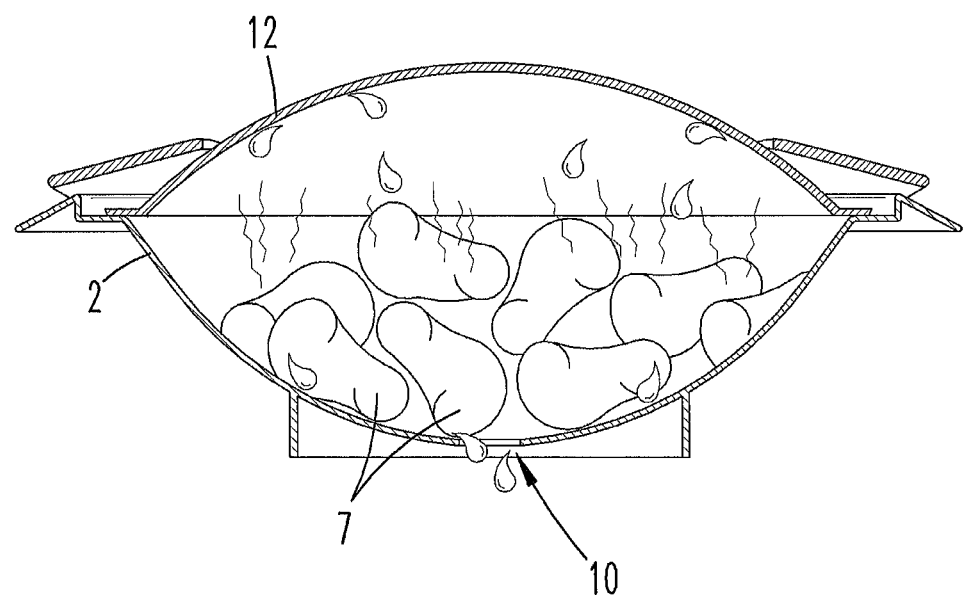

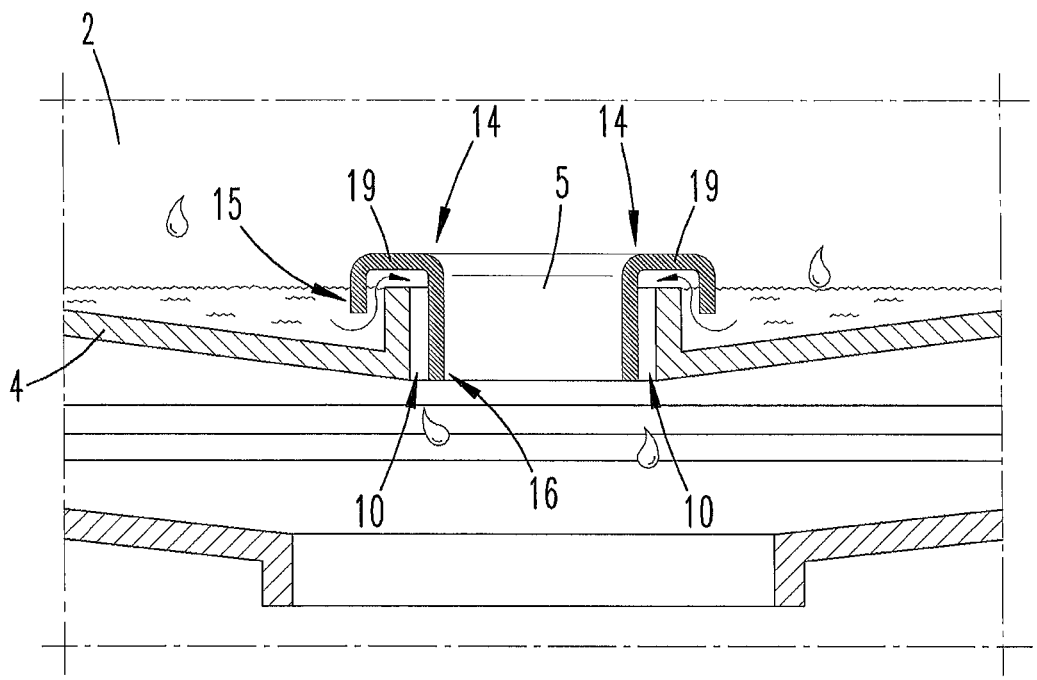

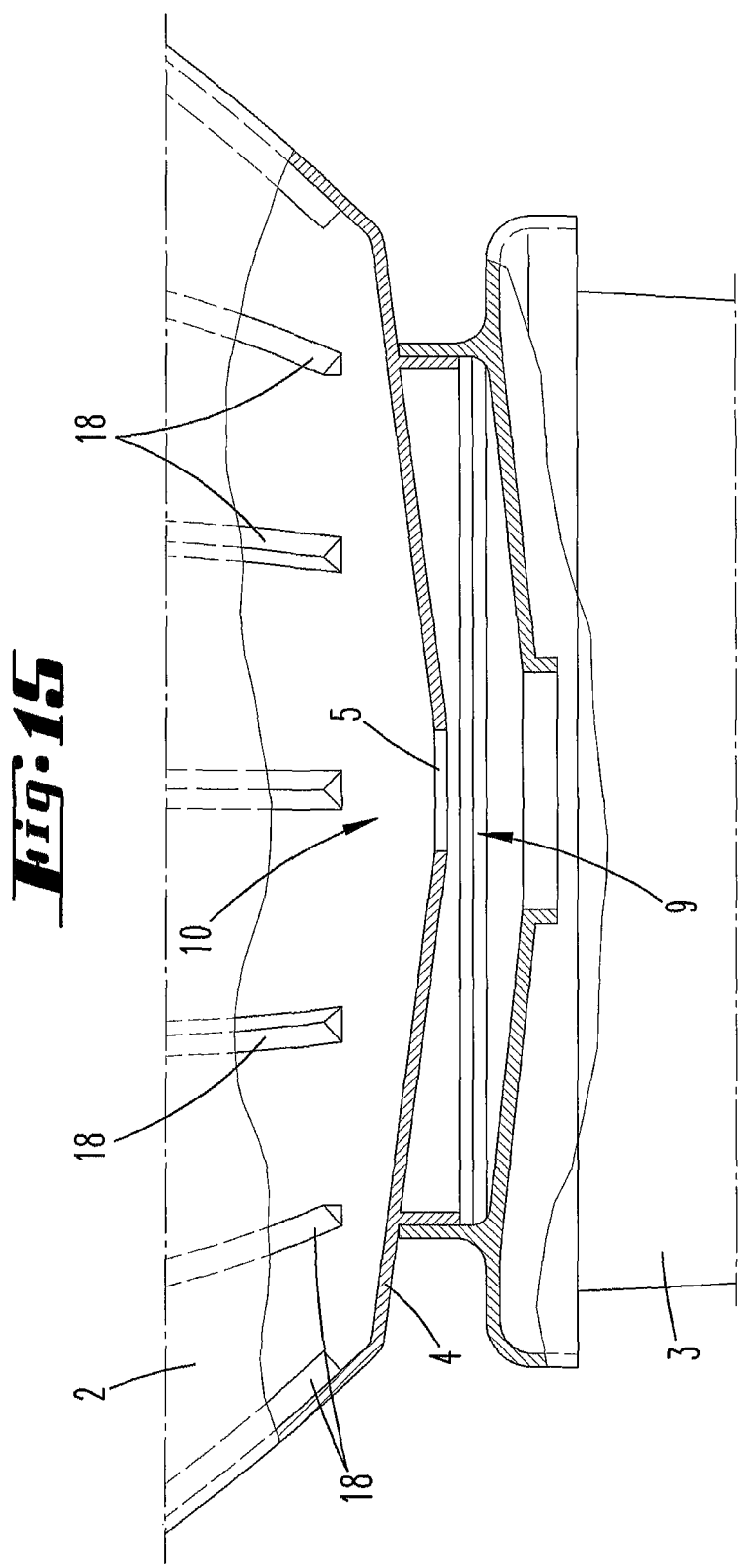

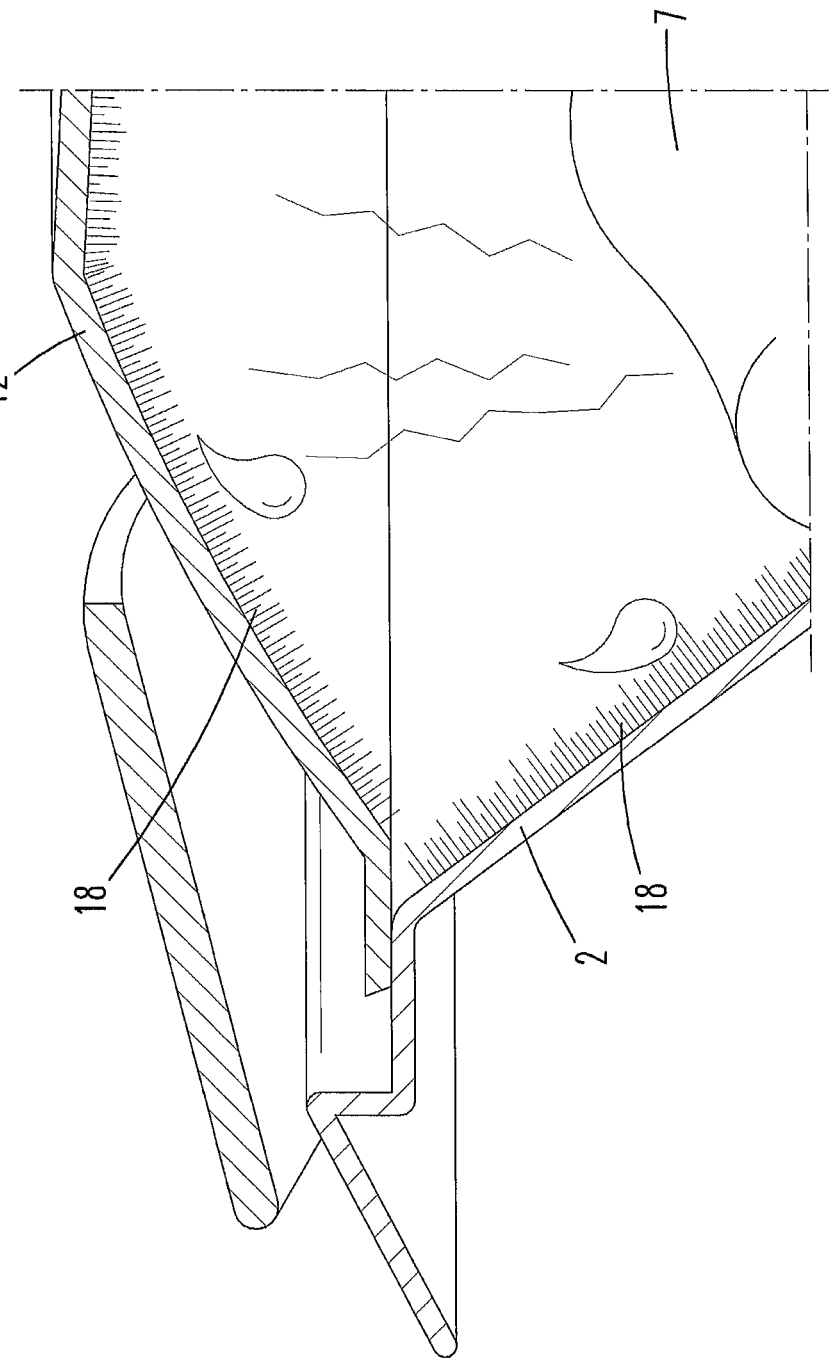

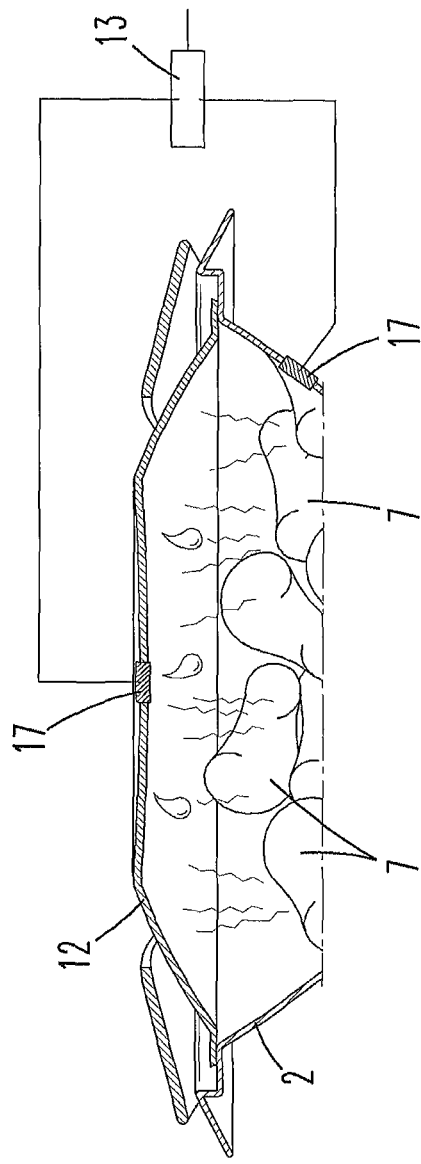

COOKING ATTACHMENT FOR A HEATABLE JAR OF A FOOD PROCESSOR

CROSS REFERENCE TO RELATED APPLICATIONS

Applicant claims priority under 35 U.S.C. § 119 of German Application No. 10 2014 115 649.8 filed on Oct. 28, 2014, the disclosure of which is incorporated by reference.

The invention relates to a cooking attachment for a heatable vessel of a kitchen appliance, which cooking attachment has a bottom comprising at least one bottom opening, through which steam, which escapes from the vessel, can enter the cooking attachment and/or condensate, which escapes from the cooking attachment, can enter the vessel.

Cooking attachments of this type are known in the prior art. Publication WO 1995/029615 A1, for example, discloses a kitchen appliance, comprising such a cooking attachment. The steam, which rises up from the vessel, is used to heat or to cook, respectively, food contained in the cooking attachment. For this purpose, the cooking attachment is attached to the vessel of the kitchen appliance, so that the steam, which rises upwards from the vessel, can reach through the bottom openings of the cooking attachment into the interior of the cooking attachment. The bottom of the cooking attachment has a perforation, for example, which contains a plurality of bottom openings. The steam, which rises up from the vessel, as well as the condensate, which is formed in the cooking attachment and which flows into the vessel of the kitchen appliance, pass through the bottom openings.

Based on the afore-mentioned prior art, the cooking attachment is to be further developed with regard to a more homogenous and quicker cooking of the food contained in the cooking attachment. It is also desired thereby to carry out the cooking process in a more energy-conserving manner and to be required to use a smaller quantity of water for the cooking.

According to a first embodiment alternative, the invention proposes as a solution for the bottom of the cooking attachment to have a plurality of spacers, which stick out from the bottom, for keeping a food contained in the cooking attachment at a distance from the bottom opening, on the side, which faces the interior of the cooking attachment, wherein the bottom opening is at least partially surrounded by the spacers in circumferential direction.

As a result of the afore-mentioned embodiment, the food contained in the cooking attachment is kept at a distance from the bottom of the cooking attachment by means of the spacers. The food thus does not rest directly against the bottom openings any longer and closes them in the unfavorable case, but a clearance is created between a bottom opening and the food, into which steam, which escapes from the vessel, can enter and through which condensate formed in the cooking attachment can escape in the direction of the vessel of the kitchen appliance. Due to the fact that the food does not rest directly on the bottom openings any longer now, the flow resistance for the condensate or steam flows, respectively, which flow through the bottom opening, is reduced. As a result, a quicker preparation of the food is made possible without having to increase the heating energy of the vessel of the kitchen appliance. In addition, the condensate formed in the cooking attachment can also flow into the vessel of the kitchen appliance more quickly, so that said condensate is available for a heating again and less water is thus required as a whole for the steam cycle. Due to the smaller quantity of liquid, which is required, the heating phase to the steam generation is simultaneously also reduced inside the vessel. To keep the bottom openings open for steam or condensate flows, respectively, from different flow directions, the bottom opening is surrounded by a plurality of spacers in circumferential direction. The spacers should surround the bottom opening at least at an angular range of 90°. However, an embodiment, in the case of which the bottom opening is surrounded completely by spacers, that is, at an angular range of 360°, for example by spacers, which are arranged equidistantly along the circumference, is preferred.

It is proposed for the bottom of the cooking attachment to have an arrangement of a plurality of bottom openings and an arrangement of a plurality of spacers, wherein the arrangement of the spacers overlaps the arrangement of the bottom openings in such a manner that a bottom opening is surrounded by a plurality of spacers in circumferential direction, and that a spacer is surrounded by a plurality of bottom openings. According to this embodiment, the bottom of the cooking attachment has a combination of bottom openings and spacers, so that a plurality of spacers is assigned to each bottom opening and a plurality of bottom openings is assigned to each spacer. This thus results in an embodiment of the bottom, which allows for the simplified exchange of steam or condensate, respectively, between the cooking attachment and the vessel of the kitchen appliance in the area of a surface of any size. For example, a bottom opening, which is arranged in the center of this surface, can be surrounded by spacers as well as by further bottom openings along the entire circumference thereof, while a bottom opening, which is a part of the edge area of this surface, is surrounded by spacers or also bottom openings, respectively, only incompletely. The overlapping arrangements of bottom openings and spacers can thereby be embodied continuously or erratically, so that substantially a same number or a different number of spacers is assigned to each bottom opening.

In particular, it is proposed for the arrangement of the bottom openings and for the arrangement of the spacers to form a continuous, at least two-dimensional structure, in which a flow channel for steam and/or condensate, which extends in a second direction, which differs from the first direction and which has consecutive bottom openings, is embodied between spacers, which are consecutive with regard to a first direction. Flow channels can be embodied specifically for a low-resistance flow of steam and/or condensate by means of the structure, which is continuous according to the invention, of the bottom openings embodied in the bottom and spacers, which are arranged on the bottom. The spacers thereby form wall sections of a flow channel, which are at least locally limited, so that a large part of the steam or the condensate, respectively, remains inside the flow channel, which has a flow connection to the bottom openings. Due to the fact that a plurality of bottom openings is assigned to each flow channel, a particularly quick discharge of the condensate is made possible from the cooking attachment into the vessel of the kitchen appliance. The condensate is thus not present at a single bottom opening, but can be distributed to a plurality of bottom openings arranged consecutively, so that a clogging of a single bottom opening, for example, does not lead to a significant reduction of the condensate flow. Steam, which rises up from the vessel into the cooking attachment, can also reach into the coking attachment through a plurality of bottom openings, wherein the steam portions, which flow through different bottom openings, are collected in the respectively assigned flow channels, and flow from there to a partial area of the bottom of the cooking attachment, which has a lowest temperature. There, the steam can condense on a wall of the cooking attachment, for example, or also on the food contained in the cooking attachment and can transfer the heat energy for the cooking process accordingly. Subsequently, the condensate, which is created, reaches back to the bottom openings via the flow channels and thus also into the vessel of the kitchen appliance, where it is available for a new steam cycle.

It is proposed for the spacers to have battlements, pins, cylinders, fins, tips, pyramids, filaments and/or grooves. On principle, however, other shapes are also suitable for embodying spacers. It is important that the spacers make it possible to space apart the food from the bottom of the cooking attachment, so that the bottom openings are kept free. The concrete arrangement of the spacers and the shapes thereof should thus make it possible for the condensate to flow in the direction of the bottom openings through any type of food. Likewise, the bottom openings are to also be kept free so that steam can pass through from the vessel into the cooking attachment. If the spacers are fins, filaments or grooves, for example, comprising a non-negligible longitudinal extension, they should have gaps in the direction of the longitudinal extension thereof, so that the steam and/or the condensate can also flow at right angles to the longitudinal extension of the spacers and can thus flow out of the respective flow channel.

A cooking attachment for a heatable vessel of a kitchen appliance is proposed according to a second embodiment alternative of the invention, which cooking attachment has a bottom comprising bottom openings, through which steam, which escapes from the vessel, can enter the cooking attachment and/or condensate, which escapes from the cooking attachment, can enter the vessel, wherein the bottom openings have at least one steam opening and at least one condensate opening, which is embodied separately from the steam opening, wherein the steam opening tapers in a steam flow direction from the vessel into the interior of the cooking attachment, while the condensate opening tapers in a condensate flow direction from the interior of the cooking attachment into the vessel. The cooking attachment according to this second embodiment alternative can in particular also have the features of the cooking attachment according to the first embodiment alternative.

According to this embodiment alternative, the bottom openings are divided into steam openings so that steam can pass through from the vessel into the cooking attachment, and into condensate openings so that condensate can pass through from the cooking attachment into the vessel of the kitchen appliance. As a result of this separate embodiment, flows, which differ with regard to the flow directions thereof, can be optimized, in particular a quicker flow of the condensate in the direction of the bottom opening and a low-resistance passage of the steam or condensate, respectively, through the bottom openings is possible. Advantageously, the steam, which flows upwards from the vessel, is not hindered by the condensate, which escapes from the cooking attachment. The differentiation of the bottom openings into steam openings and condensate openings is made by the design thereof. An enlarged opening cross section on one side of the bottom opening is a result of the tapering of the bottom openings in one of the flow directions (steam/condensate), while a reduced opening cross section results on the opposite side of the bottom. The medium, which flows along one side of the bottom, that is, either the steam or the condensate, thus preferably reaches through those bottom openings, which provide the larger opening cross section. According to the invention, the bottom openings are now embodied in such a manner that some of the bottom openings are tapered in one direction of the vessel and other bottom openings are tapered in the direction of the cooking attachment. The condensate or the steam, respectively, preferably flows through the bottom openings in this regard. The simultaneously flow-through of the same bottom opening by steam as well as condensate is reduced considerably, so that the flow resistance is reduced considerably and so that a faster flow speed can thus be attained, which, in turn, leads to a quicker preparation of the food, which is contained in the cooking attachment. As a result of the tapering of the bottom opening, a funnel-shaped opening is created, which, however, does not need to be round with regard to a cross section, but which can also be embodied so as to be oval, square, polygonal or in a similar manner. The inclination of the tapering can thereby also be variable. For example, the inclination can have an angle of 45° to the surface normal of the opening plane. As an alternative to a continuous course of the tapering, it is also possible for the tapering to take place gradually, so that partial areas of the bottom opening have an angle of 90° to the surface normal of the opening plane.

It is furthermore proposed for a collar element, which sticks out from the bottom, to be assigned to the bottom opening on the side, which faces the direction of the cooking attachment and/or on the side, which faces the direction of the vessel. The collar element can thereby continue the tapering of the opening cross section of the bottom opening in the direction of the vessel or of the cooking attachment, respectively. In the alternative, it is also possible that only the collar element has a tapering, but not the bottom opening. The collar element can be a collar element, which is located at a certain angle to the vertical of the opening plane, for example. The collar element can thereby be embodied in one piece with the bottom of the cooking attachment or also as separate collar element. As a result of the tapering embodiment, according to which the collar element substantially has the shape of a funnel, a larger quantity of the flow medium can be guided in the direction of the bottom opening on the side of the bottom, which has the larger opening cross section, than on the opposite side of the bottom opening, on which the collar element only provides for a small opening cross section. On principle, the collar element can have different designs. For example, the collar element can widen continuously or gradually as an alternative thereto. It is advisable in particular, for a distance between two bottom openings and a design of the corresponding collar elements to correspond in such a manner that the collar elements of the bottom openings simultaneously form a collar element of a bottom opening, which is arranged therebetween. In contrast to the two other collar elements, this collar element then has a tapering with regard to the same side of the bottom, on which the collar elements of the two other bottom openings are widened. A structure, in which the collar elements of adjacent bottom openings tapered in opposite directions is created through this. This structure is advisable in particular in the case of collar elements, for example, which have a rectangular cross section. The bottom of the cooking attachment thus has a plurality of bottom openings, the collar elements of which are tapered or widened, respectively, so as to alternate with regard to different flow-through directions, so that, on the one hand, steam openings are formed for the low-resistance passage of steam and, on the other hand, condensate openings are formed for a low-resistant passage of condensate. As a result of this embodiment, the condensate flow and the steam flow are separated from one another, so that, for example, the condensate, which flows into the vessel, does not hinder the steam, which flows upwards. The condensate flows across the inclined surface of the collar elements, which simultaneously serve as spacers for the food, which is contained in the cooking vessel, in the direction of the bottom openings and finally along the tapering of the collar elements in the direction of the vessel. In contrast, those collar elements, the tapered opening cross section of which is oriented in the direction of the interior of the cooking vessel, prevent condensate from passing through the bottom opening, so that said bottom opening remains free for the steam flow, which is directed upwards. On principle, the collar elements can have differently formed opening cross sections. For example, cross sections, which are formed in a round, angular or polygonal manner, are possible. The opening cross sections of the bottom openings or collar elements, respectively, which are provided for steam to flow through, should thereby advantageously be larger than a corresponding opening cross section for a steam flow. In practice, a ratio of the opening cross sections of steam to water of approximately 10:1 turned out to be advantageous, that is, the surface, which is provided for steam to flow through, should be approximately ten times the surface, which is provided for condensate to pass through.

Furthermore, a cooking attachment for a heatable vessel of a kitchen appliance is proposed according to a third embodiment alternative of the invention, which cooking attachment has a bottom comprising at least one bottom opening, through which steam, which escapes from the vessel, can enter the cooking attachment and/or condensate, which escapes from the cooking attachment, can enter the vessel, wherein the bottom is at least partially inclined in the direction of the vessel, based on a horizontal plane of the kitchen appliance, which stands on a horizontal work area, wherein the bottom opening, in particular a condensate opening for the escape of condensate from the cooking attachment into the vessel is arranged in a lowermost partial area of the inclined bottom, with regard to a vertical direction. This third embodiment alternative of the invention can thereby be combined with the features of the afore-specified first and second embodiment.

As a result of the inclination of the bottom according to the invention with regard to a horizontal plane, the outflow of condensate from the cooking attachment via the bottom opening into the vessel of the kitchen appliance is facilitated. For this purpose, the bottom opening is advantageously arranged in a lowermost partial area of the inclined bottom, particularly advantageously on a lowermost point. The bottom openings provided for the passage of a steam flow, that is, steam openings, are arranged accordingly in a higher partial area of the inclined bottom, which is located above the lowermost partial area. A separation of the condensate flow from the steam flow also takes place in this regard according to this embodiment alternative, so that the cooking process can be optimized.

Advantageously, the lowermost partial area of the inclined bottom is embodied in a central area of the bottom or in an edge area of the bottom. According to a first embodiment, in the case of which the lowermost partial area is arranged centrally on the bottom, the bottom as a whole is embodied in a funnel-shaped manner, wherein condensate advantageously flows radially towards the condensate opening arranged in the lowermost partial area from all sides. According to a second embodiment, the condensate opening is embodied in an edge area of the bottom. The edge area of the bottom—with regard to a vertical direction of the kitchen appliance—is thereby located lower than a central area. The condensate created in the cooking attachment is thus guided into the edge area of the bottom, where it can finally reach through the condensate opening into the vessel of the kitchen appliance. In a particularly advantageous manner, the edge area of the bottom can be embodied as ring-shaped area, along the circumferential direction of which a plurality of condensate openings is arranged next to one another.

It is proposed for at least a partial area of the bottom, which, with regard to the lowermost partial area of the inclined bottom, is arranged thereabove, has at least one steam opening for steam, which escapes from the vessel, to enter the cooking attachment, wherein at least a circumferential section of the steam opening, which faces away from the lowermost partial area, has a collar element, which sticks out from the bottom. The collar element keeps the condensate flows, which flow in the direction of the vessel, from passing through the steam opening. It is advisable for at least that circumferential section of the steam opining, which faces away from the lowermost partial area of the bottom, that is, which is oriented away from the condensate opening, to have a collar element. This is also the direction, which opposes the flow direction of the condensate flow. In a particularly advantageous manner, the collar element, however, is arranged along the entire circumference of the bottom opening in a ring-shaped manner, so that the bottom opening is protected from condensate to pass through from all sides. In contrast, however, the steam, which rises up from the vessel of the kitchen appliance, can still reach into the cooking attachment, in particular without interaction with the condensate flow.

A cooking attachment for a heatable vessel of a kitchen appliance is proposed according to a fourth embodiment alternative of the invention, which cooking attachment has a bottom comprising bottom openings, through which steam, which escapes from the vessel, can enter the cooking attachment and/or condensate, which escapes from the cooking attachment, can enter the vessel, wherein the bottom openings have at least one steam opening and at least one condensate opening, which is embodied separately from the steam opening, wherein the condensate opening has a capillary tube comprising a first end area and a second end area, wherein the first end area is arranged in the area of the bottom on the side facing the interior of the cooking attachment, and wherein the second end area is guided out of the cooking attachment on the side of the cooking attachment, which faces the vessel of the kitchen appliance, so that condensate located on the first end area can flow into the vessel via the capillary tube. In the case of this embodiment alternative, the capillary effect is used to guide condensate collected in the cooking attachment into the vessel of the kitchen appliance without influencing the steam flow, which is directed in opposite direction, where the condensate is then available again for a new steam cycle again. For this purpose, the cooking attachment has a capillary tube, which is in contact with the condensate collected in the cooking attachment, starting at a certain fill level. As soon as a quantity of condensate has formed in the cooking attachment, which is such that the first partial area of the capillary tube dips into the condensate volume, the condensate is guided from the cooking attaching into the vessel via the capillary tube due to the capillary effect. The level of the minimally required fill level can be varied in a particularly simple manner by means of the distance of the first end area from the bottom of the cooking attachment. According to this embodiment, the capillary effect starts only when the minimum fill level has been reached inside the coking attachment. The capillary tube can be embodied in various ways. For example, it can be a hose, tube or the like, comprising a diameter of preferably only a few μm. The smaller the diameter, the larger the capillary pressure and the distance covered by the liquid within the capillary tube. According to an alternative, a movement of the capillary tube can be formed by a collar element of the bottom of the cooking attachment can be formed, which surrounds a steam opening. This collar element sticks out from the bottom and forms a collecting area for condensate formed in the cooking attachment. It is proposed to cover this collar element with a ring, which is curved in a U-shaped manner vertically to the circumferential direction and which engages with the condensate collecting point by means of a first end area of the U-shape and which engages with the steam opening by means of a second end area of the U-shape. A U-shaped capillary tube is thereby formed between the collar element and the U-shaped ring, the diameter of which can be adjusted in radial direction, for example by means of spacers. Individual partial capillary tubes can be embodied in circumferential direction, for example by means of fins, which are arranged on the ring and/or on the collar element. The capillary effect thereby works in the same manner as is known in the prior art, so that the condensate on the first end area of the capillary tube can rise into the capillary tube due to the surface tension. As a result of an interference of the surface tension in the area of the second end area, the liquid can escape from the capillary tube again. This interference can be caused by a wick or the like, which projects into the capillary tube, for example.

According to a further embodiment alternative, the invention proposes a cooking attachment for a heatable vessel of a kitchen appliance, which cooking attachment has a bottom comprising at least one bottom opening, through which steam, which escapes from the vessel, can enter the cooking attachment and/or condensate, which escapes from the cooking attachment, can enter the vessel, wherein a vibration actuator for generating a forced vibration of the cooking attachment and/or of the lid is assigned to the cooking attachment and/or to a lid, which closes the cooking attachment, wherein the vibration is suitable to release condensate from the cooking attachment and/or the lid, so that said condensate can flow in the direction of the vessel. Advantageously, this embodiment alternative of the invention can also be combined with the afore-specified embodiment alternatives.

The invention according to this embodiment alternative is based on the knowledge that condensate, which adheres to a wall of the cooking attachment and/or of the lid, can be released from the wall by means of vibrations of the wall and thus flows in the direction of the bottom opening immediately after the condensate is formed. The forced vibration of the cooking attachment and/or of the lid is to thereby be designed in such a manner that the frequency and amplitude thereof is suitable to release the condensate drops from the wall. On principle, the vibration actuator can be an exciter, such as a piezo shaker, for example, which is arranged separately on the cooking attachment and/or the lid.

In the alternative, the vibration actuator can also be an electric motor of the kitchen appliance. A reluctance motor, the coils of which are controlled in such a manner that a vibration, which is suitable to release the condensate from the wall, is generated, is particularly suitable for this purpose.

Additional measures for quickly discharging the condensate from the cooking attachment in the direction of the vessel of the kitchen appliance are furthermore proposed with the invention. The features illustrated below can thereby be combined in combination with each of the afore-specified embodiment alternatives.

It is proposed, for example, for the cooking attachment to have a lid, the side of which, which faces in the direction of the interior of the cooking attachment, is at least partially inclined in the direction of the bottom of the cooking attachment, with regard to a horizontal plane of the cooking attachment.

In addition, the cooking attachment can also have a lid, the side of which, which faces in the direction of the interior of the cooking attachment, at least partially has a structure, which has battlements, pins, cylinders, fins, tips, pyramids, tiny hairs, filaments and/or grooves.

The lid of the cooking attachment is thereby formed in such a manner in each case that a draining of the formed condensate is facilitated. As a result of the proposed embodiments, the condensate drops are prevented from adhering to the wall of the lid. The proposed inclination and/or structure of the interior of the lid can be arranged so as to be locally limited or can also refer to the entire inner wall of the lid. The structuring serves the purpose of increasing the surface of the lid wall, so as to condense as much steam as possible on the lid wall and so as to let it drain quickly, so that the water flows into the vessel of the kitchen appliance as quickly as possible and is available for a further steam cycle. Similarly to the structure of the inside of the cooking attachment, the structure can thereby be designed in such a manner that flow channels for the condensate are formed. It is thereby important to ensure that sufficient space is available between the individual elements of the structure, for example between adjacent fins, so as to guide the condensate in the direction of the bottom openings with little resistance, so that said condensate does hot remain on the lid wall any longer than desired. As a result of the embodiment of tiny hairs or filaments on the inside of the lid (and/or on the inner wall of the cooking attachment), a lotus effect can be attained, for example, in response to which the wettability of the wall is reduced.

In addition to the afore-presented cooking attachment, the invention finally also proposes a kitchen appliance comprising such a cooking attachment.

The invention will be specified in more detail below by means of exemplary embodiments:

FIG. 5 shows a partial area of the cooking attachment according to a second embodiment alternative;

FIG. 6 shows a modified embodiment of the cooking attachment according to FIG. 5;

FIG. 7 shows a cooking attachment according to a third embodiment alternative;

FIG. 8 shows a partial area of the cooking attachment according to FIG. 7 in a top view;

FIG. 9 shows a modified embodiment of the cooking attachment according to FIG. 7;

FIG. 12 shows a cooking attachment comprising a lid according to a third embodiment;

FIG. 13 shows a cooking attachment comprising a lid according to a fourth embodiment;

FIG. 14 shows a cooking attachment according to a fourth embodiment alternative;

FIG. 15 shows a cooking attachment comprising a structured inner wall according to a first embodiment;

FIG. 16 shows a cooking attachment as well as a lid comprising a structured inner wall according to a second embodiment;

FIG. 17 shows a cooking attachment according to a fifth embodiment alternative.

Figure 1:
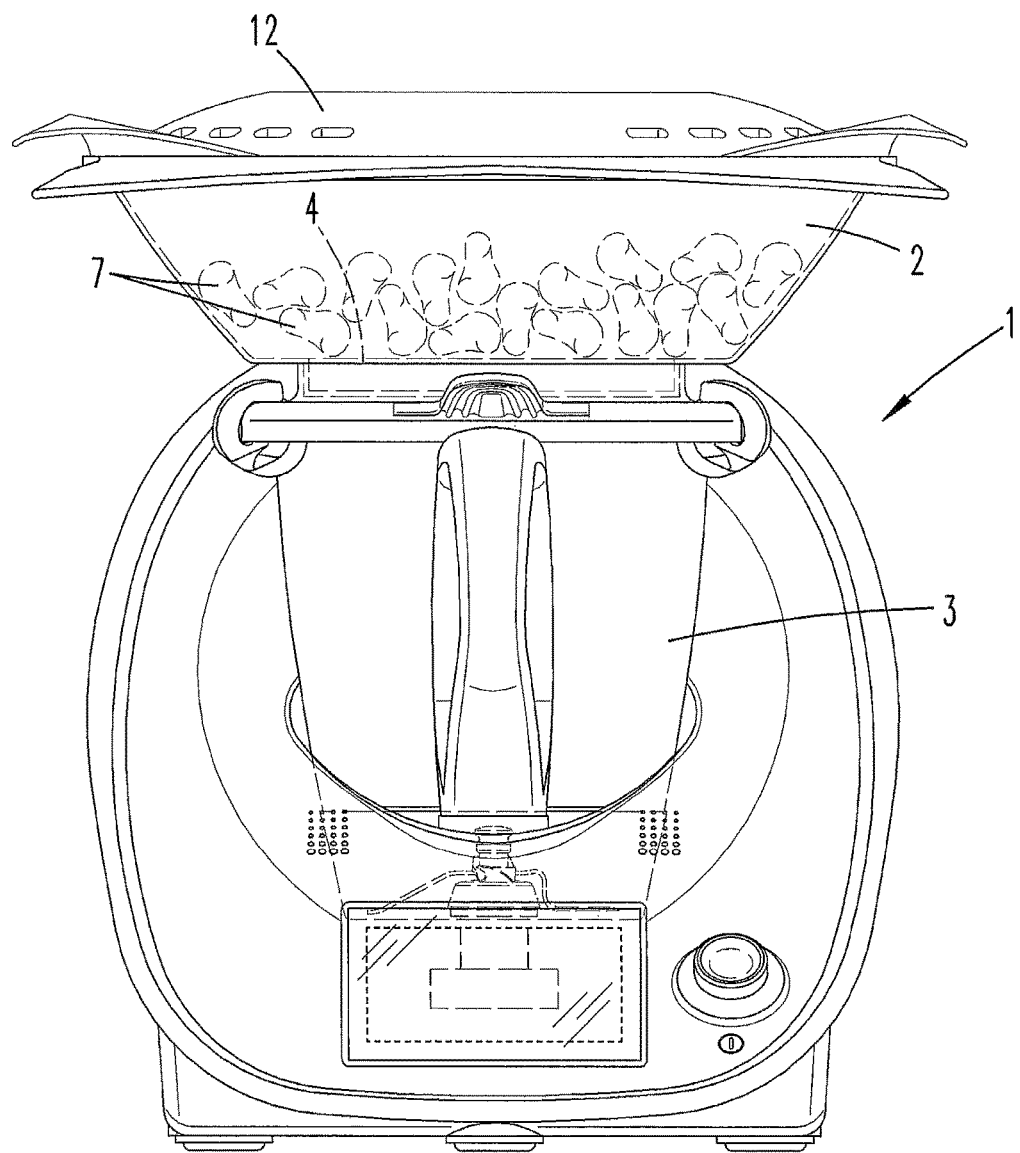
FIG. 1 shows a kitchen appliance comprising a vessel and a cooking attachment arranged thereon.

FIG. 1 shows a kitchen appliance 1 according to the invention comprising a vessel 3 inserted therein as well as a cooking attachment 2 arranged on the vessel 3. The kitchen appliance 1 is embodied here as mixer, for example, which is driven by an electric motor, and which has a mixing unit, which is assigned to the vessel 3, a vessel heater and similar devices. The mixing unit, the heating device and the like are controlled with the help of a touch display or with the help of switches.

The cooking attachment 2 has a bottom 4 comprising one or a plurality of bottom openings 5, through which steam, which escapes from the vessel 3, can enter the cooking attachment, so as to cook food contained in the cooking attachment 2. Condensate formed in the cooking attachment 2 can likewise flow into the vessel through the bottom openings 5, so as to be available at that location for a new steam cycle. The food 7, which is contained in the cooking attachment 2, can be vegetables, fish or the like, for example. To optimize the cooking process, the cooking attachment 2 is advantageously closed by means of a lid 12, so that a large part of the steam, which is generated in the vessel 3, remains in the cooking attachment 2 and is not discharged into the environment of the kitchen appliance 1.

Figure 2:
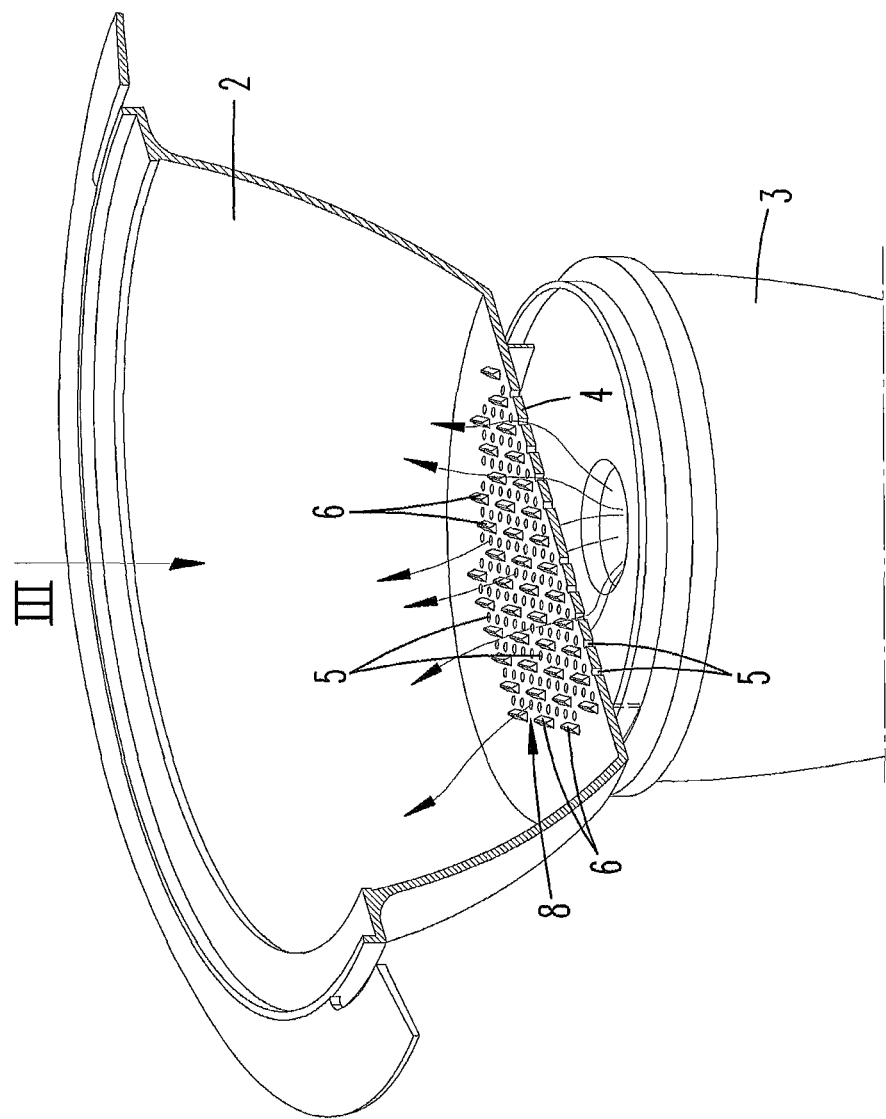
FIG. 2 shows a cooking attachment according to a first embodiment alternative in a cross sectional view.

FIG. 2 shows a vertical section through a cooking attachment 2, which is arranged on a vessel 3, according to a first embodiment alternative. The bottom 4 of the cooking attachment 2 has a plurality of bottom openings 5, which are separated by means of a plurality of spacers 6. The bottom openings 5 and the spacers 6 are thereby arranged in rows, wherein flow channels 8 for steam flows and condensate flows remain between consecutive spacers 6. The arrangement of the spacers 6 and the arrangement of the bottom openings 5 are thereby overlapped in such a manner that a bottom opening 5 is in each case surrounded by a plurality of spacers 6 in circumferential direction and that, vice versa, a spacer 6 is surrounded by a plurality of bottom openings 5. This applies at least to the bottom openings 5 or spacers 6, respectively, which are arranged in a central area of the structure. The bottom openings 5 or spacers 6, which are arranged in an edge area, are accordingly surrounded by spacers 6 or bottom openings 5, respectively, only across a certain circumferential partial section. In the shown exemplary embodiment according to FIG. 2, the spacers 6 are embodied as fins, which are arranged parallel to adjacent fins. Bottom openings 5, which are arranged in the area of the flow channels 8, are located between the fins.

Figure 3:
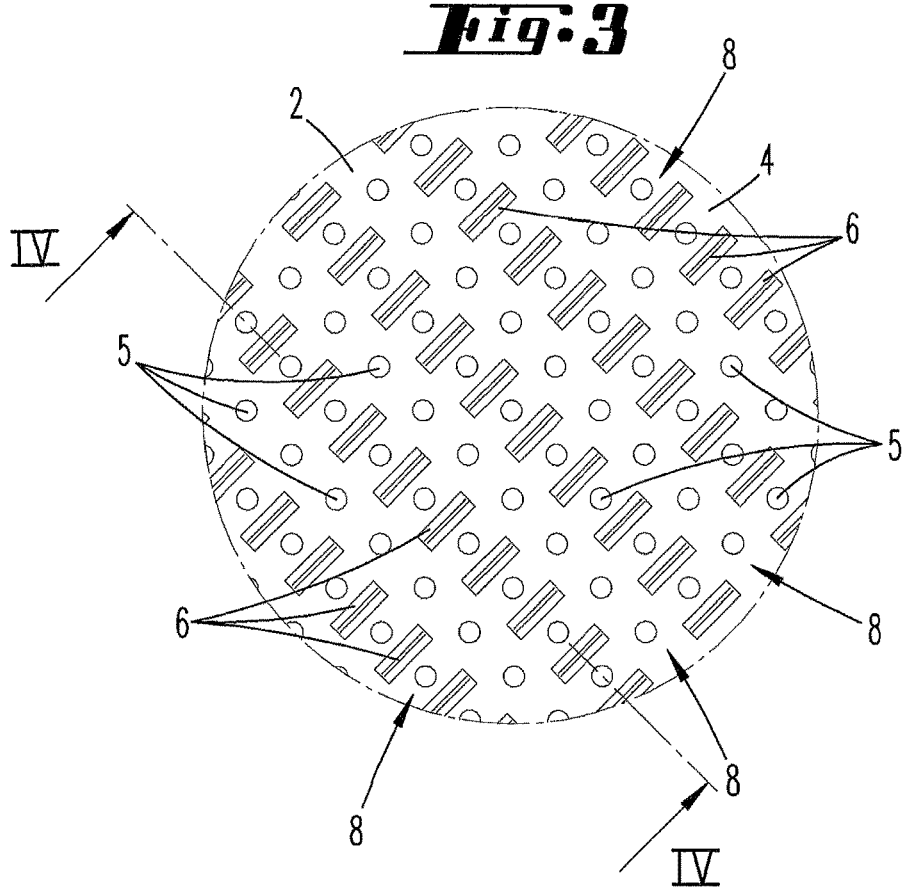
FIG. 3 shows a partial section of the cooking attachment according to FIG. 2 in a top view.

FIG. 3 shows an enlarged top view onto a partial area of the bottom 4 according to FIG. 2. The continuous structure can be seen here, which has a plurality of bottom openings 5 and a plurality of spacers 6. The bottom openings 5 are thereby arranged in a plurality of rows, which are arranged parallel to one another. The spacers 6 are likewise oriented in rows, which are arranged parallel to one another, wherein a row comprising bottom openings 5 in each case alternates with a row of spacers 6. Inside this structure, a spacer 6 is continuously surrounded by six bottom openings 5. In contrast, each bottom opening 5 is either surrounded by two bottom openings 5 and two spacers 6 or by four spacers 6 and four bottom openings 5—depending on the position thereof inside the structure. The assignment is created by the ratio between the number of the bottom openings 5 and the number of the spacers 6, which is approximately 2:1 here.

Figure 4:
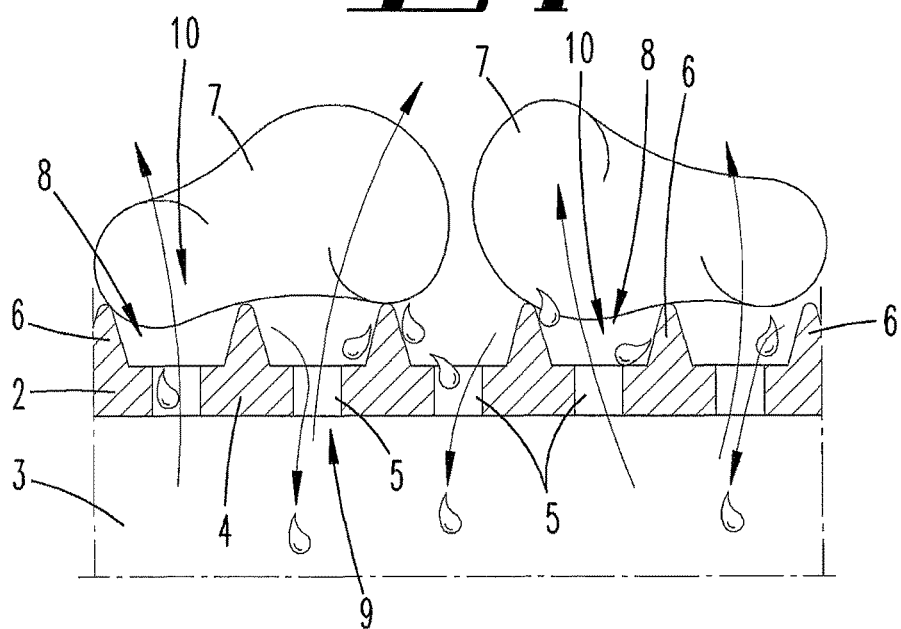
FIG. 4 shows a partial section of the cooking attachment according to FIG. 2 in an enlarged cross sectional view.

FIG. 4 shows a cross section through adjacently arranged rows of bottom openings 5 and spacers 6. The rows of the bottom openings 5 simultaneously form flow channels 8 for the flow-through of steam and/or condensate. The invention works in such a manner that the food 7, which is contained in the cooking attachment 2, is spaced apart from the bottom openings 5 by means of the spacers 6, so that the bottom openings 5 are not closed by the food 7.

Instead, the flow channels 8 between the bottom openings 5 and the food 7 remain open. At the same time, the bottom openings 5 are steam openings 9 for steam to flow through the bottom opening 5 and condensate openings 10 for condensate to flow through the bottom openings 5. The steam, which rises up from the vessel 3 of the kitchen appliance 1, can flow through the bottom openings 5 into the cooking attachment 2 and can be distributed across the bottom 4 of the cooking attachment 2 inside the flow channels 8 at that location. The hot steam thereby preferably flows to those locations inside the cooking attachment 2, which have the lowest temperature. As a result of the embodiment of the spacers 6, a flow is made possible between the bottom 4 and the food 7, which is contained in the cooking attachment 2, so that a quick and homogenous cooking result can be created for the food 7. When the steam cools down inside the cooking attachment 2, condensate is created, which can be discharged through the flow channels 8 in the direction of the bottom openings 5. The condensate finally reaches into the vessel 3 of the kitchen appliance 1 through the bottom openings 5, where it is available for a new steam cycle.

FIGS. 5 and 6 show different embodiments of advantageous embodiments of the bottom openings 5. In particular, the bottom openings 5 are embodied in such a manner that separate steam openings 9 result for the flow-through of steam and condensate openings 10 result for the flow-through of condensate. This is attained in that the bottom openings 5 are surrounded by collar elements 11, the opening cross section of which tapers either in the direction of the cooking attachment 2 or in the direction of the vessel 3.

The bottom opening 5 illustrated as the second from the left with reference to the drawing plane of FIG. 5, is a condensate opening 10, for example. It has a collar element 11, which tapers in a direction from the interior of the cooking attachment 2 to the vessel 3. The collar elements 11, which stick out from the bottom 4, simultaneously form spacers 6 for keeping a food 7, which is arranged in the cooking attachment 2, at a distance from the bottom openings 5.

A partial area of the collar element 11 of the condensate opening 10 furthermore forms a partial area of a collar element 11 of an adjacent steam opening 9 (illustrated on the left thereof in the figure). This steam opening 9 has an opening cross section, which tapers in a direction from the vessel 3 into the interior of the cooking attachment 2, that is, the tapering of which runs in the direction opposite to the tapering of the condensate opening 10. Advantageously, the collar elements 11 have an angular, for example square, cross sectional shape in a top view, so that a partial area of a collar element 11 of a first bottom opening 5 can be formed by means of a partial area of a collar element 11 of an adjacent bottom opening 5. On principle, it is not necessarily required for a collar element 11 to completely enclose a bottom opening 5 in circumferential direction. Instead, the collar element 11 can be formed of individual partial sections, which are spaced apart from one another, so that flow channels 8 still remain on the bottom 4 of the cooking attachment 2. In addition to the inclined collar elements, which are illustrated in FIG. 5, the collar elements 11 can stand substantially vertically to the bottom 4 of the cooking attachment 2 as an alternative. In this case, the collar element 11 can be tapered gradually, so that the side, which is oriented in the direction of the vessel 3, for example, provides a larger opening cross section than the side, which faces in the direction of the interior of the cooking attachment 2. Steam openings 9 and condensate openings 10, the tapering of which runs in opposite directions, can thus also be embodied again next to one another.

On principle, it is also possible in the context of the invention to not only realize tapering opening cross sections by means of collar elements 11, which stick out from the bottom 4, but to embody the tapering in the plane of the bottom 4, so that the end areas of the bottom openings 5 have different sizes on the opposite sides of the bottom 4. In this case, it is not necessary to keep the food 7 at a distance from the bottom openings 5 by means of spacers 6. It goes without saying, however, that separate spacers 6 can be arranged on the bottom 4.

FIG. 7 shows a third embodiment alternative of the invention, according to which the bottom 4 of the cooking attachment 2 is inclined in the direction of the vessel 3 of the kitchen appliance 1. The lowermost partial area of the inclined bottom 4 is thereby located centrally in the center of the bottom 4, so that condensate collected in the cooking attachment 2 can flow towards the bottom opening 5 along the entire circumference of the bottom opening 5. In addition to the bottom opening 5, which is embodied centrally as condensate opening 10, the bottom 4 also has a plurality of bottom openings 5, which are embodied as steam opening 9. With regard to the lowermost partial area of the inclined bottom, the steam openings 9 are located at a partial area located thereabove, so that the condensate flows past the steam openings 9 on its way in the direction of the condensate opening 10. The steam openings 9 have collar elements 11, which, on the one hand, serve as spacers 6 for the food 7, which is arranged in the cooking attachment 2, and, on the other hand, to protect the steam openings 9 from a flow-through of the condensate. The flows of steam and condensate, which occur continuously in opposite directions, are optimally separated from one another in this manner.

FIG. 8 shows a top view onto a partial area of the bottom 4 according to FIG. 7. It can be seen that the condensate opening 10 is surrounded by a plurality of, namely eight, steam openings 9, in circumferential direction. Each steam opening 9 thereby has a collar element 11, which completely surrounds the bottom opening 5 in circumferential direction.

In contrast, FIG. 9 shows an embodiment, in the case of which the steam openings 9 are surrounded by collar elements 11 only in a certain circumferential section. Advantageously, these collar elements 11 are located at that side of the bottom opening 5, through which a condensate, which flows down from the inclined bottom 4, passes. Condensate continuously does not flow across the circumferential section of the bottom opening 5, which is not protected by a collar element 11, because it is located at a lower point than the bottom opening 5.

Figure 10:
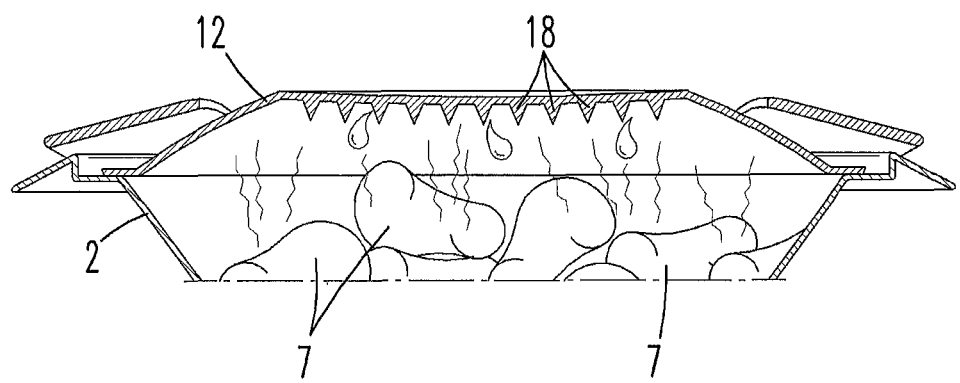
FIG. 10 shows a cooking attachment comprising a structured lid according to a first embodiment.
Figure 11:
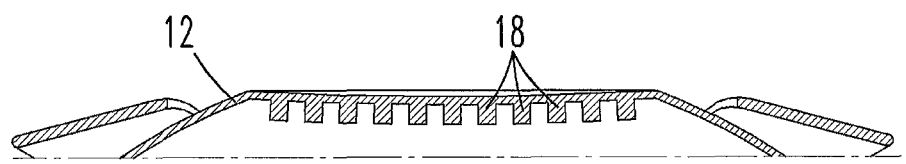
FIG. 11 shows a structured lid according to a second embodiment.

FIGS. 10 to 13 show embodiments according to the invention of a lid 12 of the cooking attachment 2, with the help of which the adhesion of condensate to the inner side of the lid 12 can be prevented. FIGS. 10 and 11 thereby show structures, for example, which are designed as tips (FIG. 10) or as fins (FIG. 11), respectively. These structures provide for an enlarged surface for condensing steam on the lid 12. FIGS. 12 and 13 show an inclined embodiment of the lid 12, so that condensate, which is formed on the inner side of the lid 12, flows in the direction of the cooking attachment 2 as a result of the force of gravity.

FIG. 14 shows a fourth embodiment alternative of the invention, in the case of which a capillary tube 14 is embodied on the cooking attachment 2. The capillary tube 14 is formed between a collar element 11, which limits a steam opening 9, and a limiting element 19, which extends across the collar element 11 in a U-shaped manner. The limiting element 19 is embodied in a substantially ring-shaped manner and is folded in a U-shaped manner in radial direction of the ring. A capillary tube 14, which is also U-shaped and which connects the inner area of the cooking attachment 2 to the vessel 3 in the kitchen appliance 1 in a fluidic manner, is thus created between the collar element 11 and the limiting element 19. Advantageously, the capillary tube 14 has a diameter of a few μm in radial direction of the bottom opening 5. In circumferential direction, the capillary tube 14 can be separated into individual partial capillary tubes by means of walls (not illustrated). The capillary tube 14 has a first end area 15, which projects into the condensate, which is collected on the bottom 4 of the cooking attachment 2. A second end area 16 of the capillary tube 14 is guided outwards in the direction of the vessel 3 through the bottom opening 5. As soon as the condensate on the bottom 4 of the cooking attachment 2 comes into contact with the first end area 15, said condensate can rise into the capillary tube 14 as a result of the capillary effect and can be conveyed in the direction of the vessel 3.

FIGS. 15 and 16 show embodiment alternatives of a structure 18, which is arranged on the inside of a cooking attachment 2. The structure 8 according to FIG. 15 consists of fins, which are arranged in parallel to one another and which are substantially oriented radially towards a bottom opening 5. The condensate formed in the cooking attachment 2 can flow towards the bottom opening 5 between adjacent fins. In contrast, FIG. 16 shows an embodiment, in the case of which the inside of the cooking attachment 2 as well as the inside of the lid 12 have tiny hairs of different lengths. This structure 18 promotes a release of the condensate from the inner wall of the cooking attachment 2 or of the lid 12, respectively, so that the condensate can be guided into the vessel 3 particularly quickly, where it is finally heated and evaporated again, so as to heat the food 7 in a new cycle.

Finally, FIG. 17 shows a fifth embodiment alternative of the invention, in the case of which vibration actuators 17 are arranged on the cooking attachment 2 as well as on the lid 12. Here, the vibration actuators 17 are piezo shakers, for example, to which a tension is applied by means of a control 13 in such a manner that they carry out forced vibrations, which, in turn, are transferred to the walls of the cooking attachment 2 or of the lid 12, respectively. As a result of the vibrations of the cooking attachment 2 or of the lid 12, respectively, condensate, which adheres to the wall, is released, so that it can be guided back into the vessel of the kitchen appliance 1 quickly and is available again for heating the food 7.

Even though the above-described figures do not show all of the features according to the invention in one embodiment, it goes without saying that it is also possible to combine different features, all of which serve the purpose according to the invention, of making the cooking process particularly effectively.

REFERENCE LIST 1 kitchen appliance
2 cooking attachment
3 vessel
4 bottom
5 bottom opening
6 spacer
7 food
8 flow channel
9 steam opening
10 condensate opening
11 collar element
12 lid
13 control
14 capillary tube
15 first end area
16 second end area
17 vibration actuator
18 structure
19 limiting element

The invention claimed is:

1. A cooking attachment for a heatable vessel of a kitchen appliance, which cooking attachment has a bottom comprising bottom openings, through which steam, which escapes from the vessel, can enter the cooking attachment and/or condensate, which escapes from the cooking attachment, can enter the vessel, and spacers,
wherein the bottom openings have at least one steam opening and at least one condensate opening, which is embodied separately from the steam opening,
wherein the steam opening tapers in a steam flow direction from the vessel into the interior of the cooking attachment, while the condensate opening tapers in a condensate flow direction from the interior of the cooking attachment into the vessel,
wherein a collar element, which sticks out from the bottom, is assigned to one of the bottom openings on the side, which faces the direction of the cooking attachment and on the side, which faces the direction of the vessel, such that a first collar element is arranged in a flow direction in front of the opening and a second collar element is arranged in a flow direction behind the same opening,
wherein the spacers are built as fins, filaments or grooves comprising a longitudinal extension,
wherein the spacers have gaps in the direction of the longitudinal extension so that the steam and/or the condensate can also flow at right angles to the longitudinal extension of the spacers,
wherein the spacers follow each other consecutively in a first direction that is parallel to the longitudinal extension of the spacers and in a second direction that is perpendicular to the longitudinal extension of the spacers, and
wherein a flow channel for the steam and/or the condensate extends in the second direction perpendicular to the first direction.

2. The cooking attachment according to claim 1, wherein a subset of the spacers stick out from the bottom for keeping a food contained in the cooking attachment at a distance from the one of the bottom openings, on the side, which faces the interior of the cooking attachment, and
wherein the one of the bottom openings is at least partially surrounded by the subset of the spacers in circumferential direction.

3. The cooking attachment according to claim 2, wherein the bottom openings form a bottom openings arrangement and the spacers form a spacers arrangement, and
wherein the spacers arrangement overlaps the bottom openings arrangement in such a manner that each of the bottom openings is surrounded by a subset of the spacers in circumferential direction, and that each of the spacers is surrounded by a subset of bottom openings.

4. The cooking attachment according to claim 2, wherein the bottom is at least partially inclined in the direction of the vessel, based on a horizontal plane of the kitchen appliance, which stands on a horizontal work area, and
wherein the bottom opening, in particular a condensate opening for the escape of condensate from the cooking attachment into the vessel, is arranged in a lowermost partial area of the inclined bottom, with regard to a vertical direction.

5. The cooking attachment according to claim 4, wherein the lowermost partial area of the inclined bottom is embodied in a central area of the bottom or in an edge area of the bottom.

6. The cooking attachment according to claim 4, wherein at least a partial area of the bottom, which, with regard to the lowermost partial area of the inclined bottom, is arranged thereabove, has at least one steam opening for steam, which escapes from the vessel, to enter the cooking attachment, and
wherein at least a circumferential section of the steam opening, which faces away from the lowermost partial area, has a collar element, which sticks out from the bottom.

7. The cooking attachment according to claim 2, wherein the condensate opening has a capillary tube comprising a first end area and a second end area, wherein the first end area is arranged in the area of the bottom on the side facing the interior of the cooking attachment, and
wherein the second end area is guided out of the cooking attachment on the side of the cooking attachment, which faces the vessel of the kitchen appliance, so that condensate located on the first end area can flow into the vessel via the capillary tube.

8. The cooking attachment according to claim 2, wherein a vibration actuator for generating a forced vibration of the cooking attachment and/or of the lid is assigned to the cooking attachment and/or to a lid, which closes the cooking attachment, and
wherein the vibration is suitable to release condensate from the cooking attachment and/or the lid, so that said condensate can flow in the direction of the vessel.

9. The cooking attachment according to claim 8, wherein the vibrating actuator is an electric motor, in particular a reluctance motor, of the kitchen appliance.

10. The cooking attachment according to claim 2, further comprising a lid, the side of which, which faces in the direction of the interior of the cooking attachment, is at least partially inclined in the direction of the bottom of the cooking attachment, with regard to a horizontal plane of the cooking attachment.

11. The cooking attachment according to claim 2, further comprising a lid, the side of which, which faces in the direction of the interior of the cooking attachment, at least partially has a structure, which has battlements, pins, cylinders, fins, tips, pyramids, tiny hairs, filaments and/or grooves.

\* \* \* \* \*